United States Patent
Tiberghien et al.

(10) Patent No.: US 11,060,649 B2
(45) Date of Patent: Jul. 13, 2021

(54) QUICK COUPLING FOR THE DETACHABLE CONNECTION OF TWO PIPES THROUGH WHICH A PRESSURIZED FLUID FLOWS

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Igor Bahno, Ugine (FR); Olivier Pastore, Ugine (FR); Olivier Poly, Chavanod (FR); Serafim Marques-Barroca, Frontenex (FR); Romain Mayer, Hery sur Ugine (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 91 days.

(21) Appl. No.: 16/518,116

(22) Filed: Jul. 22, 2019

(65) Prior Publication Data
US 2020/0032941 A1 Jan. 30, 2020

(30) Foreign Application Priority Data

Jul. 24, 2018 (FR) ...................................... 1856848

(51) Int. Cl.
*F16L 37/40* (2006.01)
(52) U.S. Cl.
CPC ....... *F16L 37/40* (2013.01); *Y10T 137/87949* (2015.04)
(58) Field of Classification Search
CPC .................................. F16L 37/32; F16L 37/40
USPC ....................................................... 137/614.03
See application file for complete search history.

(56) References Cited

U.S. PATENT DOCUMENTS 9,032,997 B2 * 5/2015 Abura et al. ............ F16L 37/34
137/614.02

FOREIGN PATENT DOCUMENTS

| FR | 2861159 A1 | 4/2005 |
|----|------------|--------|
| JP | 2007024233 A | 2/2007 |
| WO | 2016/037890 A1 | 3/2016 |

OTHER PUBLICATIONS

International Search Report FR1856848, dated May 17, 2009, 2 Pages.

* cited by examiner

*Primary Examiner* — Kevin L Lee

(57) ABSTRACT

The invention relates to a quick coupling for the detachable connection of two pipes through which a pressurized fluid flows, the quick coupling made up of a male element and a female element. The male element includes a male cylindrical body defining a cavity, a valve movable axially within the cavity, and a first sealing gasket. The female element includes a female cylindrical body defining a cavity, a slide valve movable axially within the cavity, a second sealing gasket, and a peripheral groove that houses either the first or second sealing gasket. A proximal or distal edge of the peripheral groove extends between two planes that are perpendicular to a longitudinal axis of the male or female element, respectively between a proximal plane and a distal plane, which are offset relative to one another along the longitudinal axis.

17 Claims, 15 Drawing Sheets

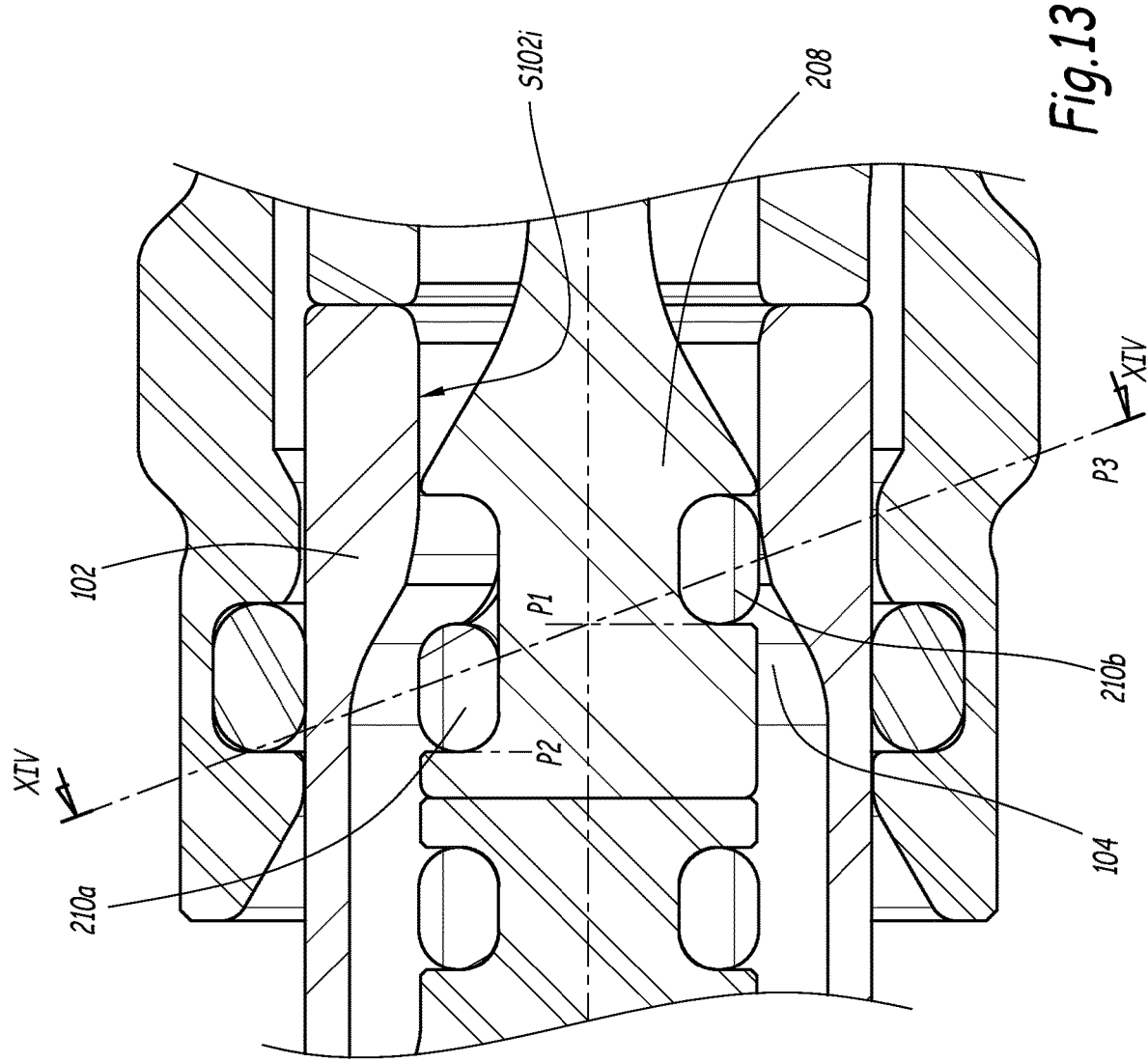

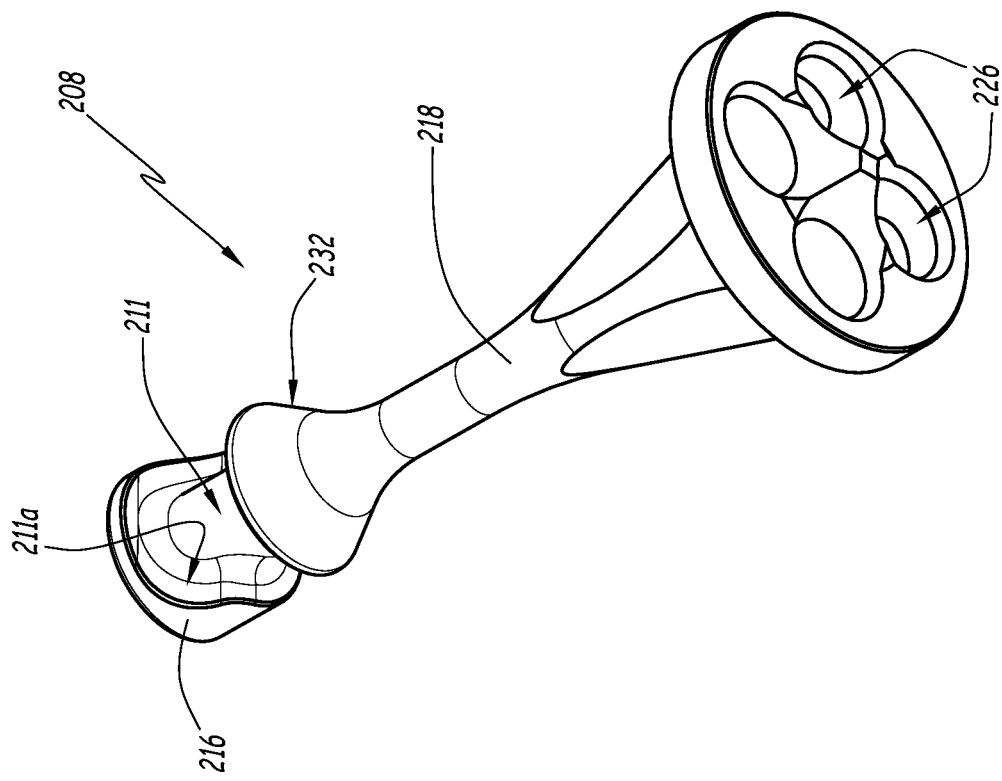
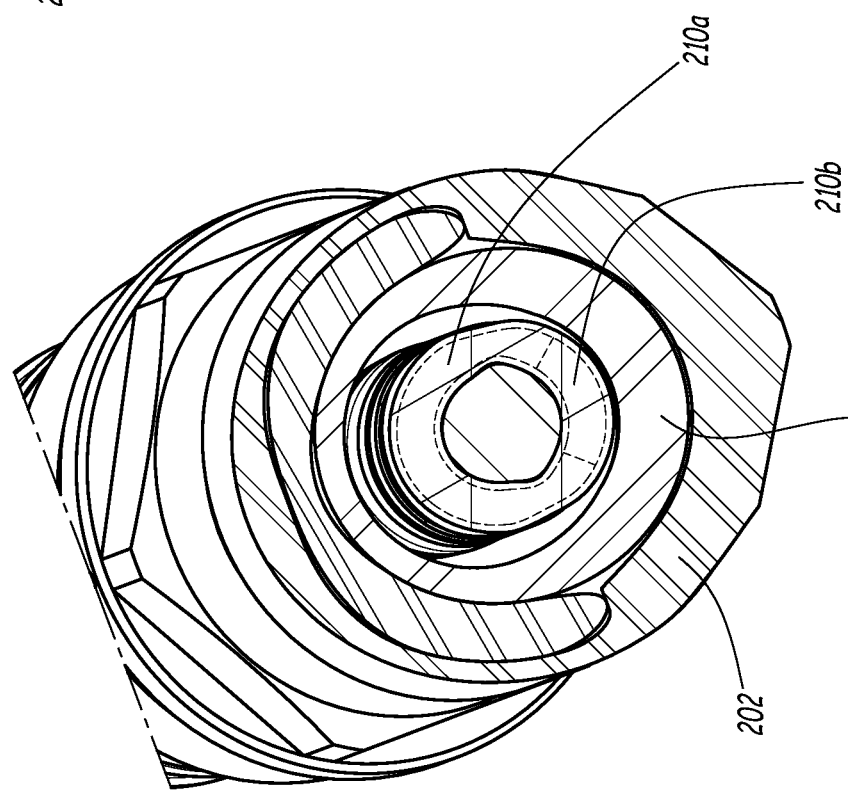
Fig.15
Fig.14

QUICK COUPLING FOR THE DETACHABLE CONNECTION OF TWO PIPES THROUGH WHICH A PRESSURIZED FLUID FLOWS

CROSS-REFERENCE TO RELATED APPLICATION

This application claims priority to French patent application no. 1856848, filed on Jul. 24, 2018.

BACKGROUND OF THE INVENTION

Field of the Invention

The present invention relates to a quick coupling for the detachable connection of two pipes through which a pressurized fluid flows.

Description of Related Art

In the field of connecting pipes for pressurized fluid, it is known to use a coupling comprising two complementary coupling elements (male and female). The two coupling elements include movable members that push one another, by simple approach of the two coupling elements, to open a fluid stream connecting the passage pipes of the two coupling elements. In practice, there is a sealing element, of the O-ring type, that provides the sealing between the respective ducts of the two coupling elements when it is in contact with the surface, often cylindrical. The fluid stream opens as of the loss of this contact. Therefore, the sealing element is directly exposed to the fluid circulating in the stream in the coupled position of the coupling, and as of the (pressure) balancing of the ducts to be connected. FR 2,861,159 A1 discloses an example coupling of this type.

One problem inherent to the connection of pressurized pipes is that there is often a significant pressure differential between the two pipes to be connected: in general, one of the two pipes is often pressurized during the coupling (usage pressure). Thus, the sealing gasket undergoes significant stresses when the fluid communication between the two coupling elements is established, in particular because the pressure balancing occurs abruptly.

In FR 2,861,159 A1 typically, the sealing gasket is subjected to a pressure peak when the plunger of the female coupling element exceeds the mouth of the complementary male coupling element at a cone, and pushes the male valve back to connect the two pipes. This phase takes place in a so-called balancing configuration that is identified between the beginning of coupling and the total connection phase of the ducts. This is the last sealing barrier between the two ducts to be connected.

During balancing, the pressure exerted on the periphery of the gasket increases abruptly, such that part or all of the gasket is stretched and driven by the pressure against the shoulder of the housing. In the most favorable case, the gasket is located across the inside of its housing, while in the most unfavorable case, the gasket comes completely out of its housing. This positioning defect causes, during the mechanical disconnection of the coupling elements, leaks at the front face of the pressurized coupling element, which for example comes from an incorrect return into position of the sealing elements on the front face. Clearly, this sealing problem can prove damaging, in particular for fragile electronic cooling applications or in case of oil spill on flammable apparatuses.

The exposure of the gaskets in the fluid stream can therefore cause closing and sealing problems upon disconnection of the coupling. In the long term, the partial expulsion of the gasket from its housing can also raise accelerated deterioration problems.

To offset this problem, it is known, for example from EP 2,669,560 A1, to produce a leak at a sealing face in order to discharge the pressurized duct via an additional sealing section, in addition to that providing the sealing of the coupling in the coupled state. This solution requires the creation of a sealing zone and an additional gasket that add design constraints related to the bulk and industrialization constraints. The created leak is dispersed outside the coupling, which is problematic in some applications. Furthermore, the problem of driving of the gasket by the fluid flow rate at the connection is potentially reduced, but not resolved by the pressure decrease.

It is also known from EP 0,477,949 A1 to provide gasket protection suitable for the passage of fluid in the radial direction, but the dynamic friction of which upon each connection on the surfaces of the mechanical parts can be harmful in the lifetime of the gasket.

BRIEF SUMMARY OF THE INVENTION

The invention aims to resolve the aforementioned drawbacks by proposing a new coupling that offsets the abrupt pressure increase situation upon the connection of the two coupling elements, to avoid the temporary or permanent dislocation of the sealing gasket during the pressure balancing.

To that end, the invention relates to a quick coupling for the detachable connection of two pipes through which a pressurized fluid flows, made up of a male element and a female element able to receive the male element by fitting along a longitudinal axis between an uncoupled configuration and a coupled configuration.

The male element comprises a cylindrical male body, defining a longitudinal cavity and a distal mouth with a diameter smaller than that of the cavity, a valve axially movable inside the cavity, between a forward position in which it closes off the mouth and a withdrawn position in which it does not close off the mouth, and a first sealing gasket that is borne by the valve or the male body, and which bears respectively on an inner cylindrical wall of the male body or on an outer cylindrical wall of the valve, when the valve is in the forward position.

The female element comprises a cylindrical female body, defining a longitudinal cavity and a distal mouth with a diameter smaller than or equal to that of the cavity, a slide valve, movable axially inside the longitudinal cavity between a forward position, in which it closes off the mouth, and a withdrawn position, in which it does not close off the mouth, and a second sealing gasket that is borne by a member from among a central push-piece secured to the female body, the slide valve or the female body and which bears on another member from among the slide valve, the push-piece or the female body, when the slide valve is in the forward position.

According to the invention, the first or the second sealing gasket is housed inside a peripheral groove. Therefore, a proximal or distal edge of the peripheral groove extends between two planes that are perpendicular to a longitudinal axis of the male or female element, respectively between a proximal plane and a distal plane, which are offset relative to one another along the longitudinal axis.

Thus, the effect of the invention is to create a local leak on an inner or outer gasket segment before the complete opening of the circuit, which makes it possible to cause the pressure to drop, without the gasket being abruptly exposed to the pressure from the fluid stream and without creating leaks outside the coupling.

According to advantageous, but optional aspects of the invention, the coupling may include one or more of the following features, considered in any technically allowable combination:

- The two proximal and distal planes are offset from one another by a distance corresponding to one, two, three or four toroid thicknesses of the first or the second sealing gasket.
- The proximal or distal edge of the peripheral groove comprises two sections positioned relative to one another at a distance, measured parallel to the longitudinal axis, identical to the distance between the proximal plane and the distal plane, whereas these two sections are positioned diametrically opposite one another.
- The slide valve is positioned radially between the female body and a central push-piece secured to the female body.
- The first sealing gasket is borne by the male body or the valve, while the second sealing gasket is borne by the slide valve or the central push-piece.
- In a balancing configuration, defined between the uncoupled configuration and the coupled configuration of the coupling, the second sealing gasket comprises a rear portion that is in sealed contact with the inner cylindrical wall of the male body and a front portion that is not in sealed contact with the inner cylindrical wall of the male body, such that a fluid connection is formed between the cavities of the male and female elements.
- The inner cylindrical wall of the male body is able to radially retain the rear portion of the second sealing gasket in the balancing configuration, the front portion of the second sealing gasket not being radially retained.
- In a balancing configuration, defined between the uncoupled configuration and the coupled configuration of the coupling, the first sealing gasket comprises a rear portion that is in sealed contact with an outer cylindrical wall of the central push-piece and a front portion that is not in sealed contact with the outer cylindrical wall of the central push-piece, such that a fluid connection is formed between the cavities of the male and female elements.
- The rear portion of the first sealing gasket is radially retained by the outer cylindrical wall of the central push-piece in the balancing configuration, the front portion of the first sealing gasket not being radially retained.
- The contact between the rear portion of the first sealing gasket or the second sealing gasket and respectively the central push-piece or the male body is a linear contact.
- The contact line between the rear portion of the first sealing gasket or the second sealing gasket and respectively the central push-piece or the male body, comprises several separate linear segments.
- The fluid connection between the cavities of the male and female elements is done sealably relative to the outside.
- The peripheral groove is formed on an outer cylindrical wall of the central push-piece and houses the second sealing gasket, while the first sealing gasket is housed inside another peripheral groove formed on the outer cylindrical wall of the valve.
- The peripheral groove is formed on the inner cylindrical wall of the male body and houses the first sealing gasket, while the second sealing gasket is housed inside another peripheral groove formed on an inner cylindrical wall of the slide valve.
- The peripheral groove has an elliptical shape in an oblique plane relative to a plane perpendicular to a longitudinal axis of the coupling element.

BRIEF DESCRIPTION OF THE SEVERAL VIEWS OF THE DRAWINGS

The invention and other advantages thereof will appear more clearly in light of the following description of four embodiments of a coupling according to its principle, provided solely as an example and done in reference to the appended drawings, in which:

FIG. 13 is a sectional view comparable to that of FIG. 12, in which the coupling is in a second subsequent configuration, called balancing configuration, between the uncoupled configuration and the coupled configuration;

FIG. 14 is a sectional view in plane XIV-XIV of FIG. 13;

FIG. 15 is a perspective view of a push-piece belonging to a coupling element, of the female type, of the coupling according to the third embodiment.

DETAILED DESCRIPTION OF THE INVENTION

FIGS. 1 to 6 show a first embodiment of a quick coupling R for the detachable connection of two pipes C1 and C2 through which a pressurized fluid flows. The pipes C1 and C2 are shown schematically in thin lines in FIG. 1 only.

Advantageously, the coupling R can be used irrespective of the direction of flow of the fluid inside the ducts C1 and C2.

Figure 1:
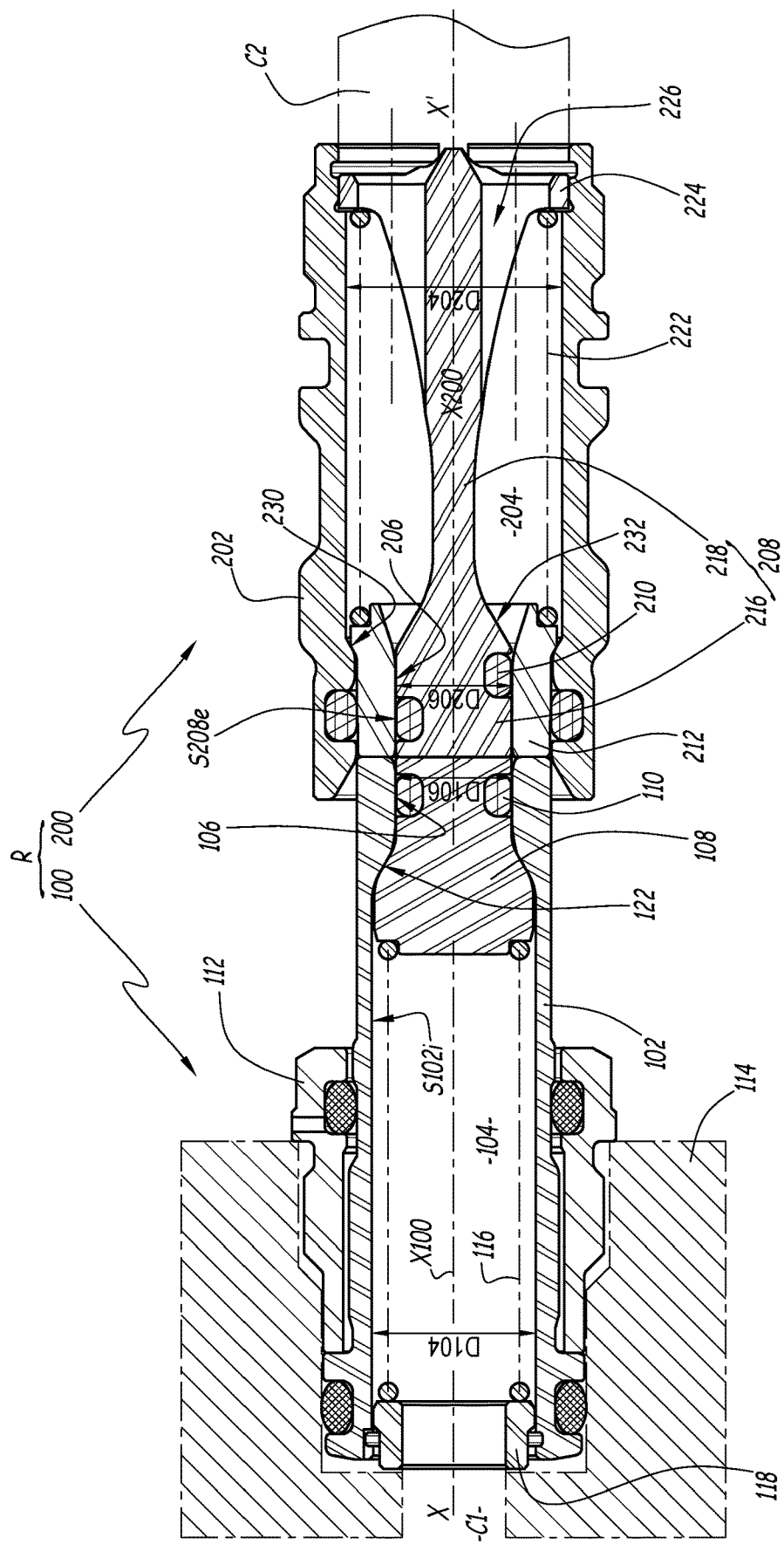
FIG. 1 is a longitudinal sectional view of a coupling according to a first embodiment of the invention, in which the coupling is shown in an uncoupled configuration.

As shown in FIG. 1, the coupling R is made up of a male element 100 and a female element 200 capable of receiving the male element 100 by fitting along the longitudinal axis X-X'.

The invention particularly applies to the configuration where one of the pipes among the pipes C1 and C2 is pressurized, typically at a so-called usage pressure of between 3 and 7 bars, while the other pipe is not pressurized. For example, one of the coupling elements 100 or 200 is fastened sealably to a coolant source and flow rate apparatus (not shown) upstream, and the other element, respectively 200 or 100, to the feed of a device for conducting coolant toward downstream electronic circuits (not shown).

In a coordinate system associated with a coupling element 100 or 200, the "forward" and "distal" directions are defined as directions parallel to the longitudinal axis X-X' and facing toward the complementary coupling element, respectively 200 or 100. Conversely, the "rear" and "proximal" directions are defined as directions parallel to the longitudinal axis X-X' and facing the side opposite the complementary coupling element 200 or 100.

In the example, the rear part of the male element 100 is connected to the pipe C1, while the rear part of the female element 200 is connected to the pipe C2.

As shown in FIG. 1, the male element 100 globally assumes the shape of a cylinder, centered on a longitudinal axis X100.

The male element 100 comprises a cylindrical male body 102, centered on the axis X100 and defining a longitudinal cavity 104 and a distal mouth 106, the diameter D106 of which is smaller than the diameter D104 of the cavity 104.

A nut 112 is positioned coaxially around the male body 102. The nut 112 is screwed inside a tapping defined by a coupling plate 114, described as "downstream plate".

Figure 6:
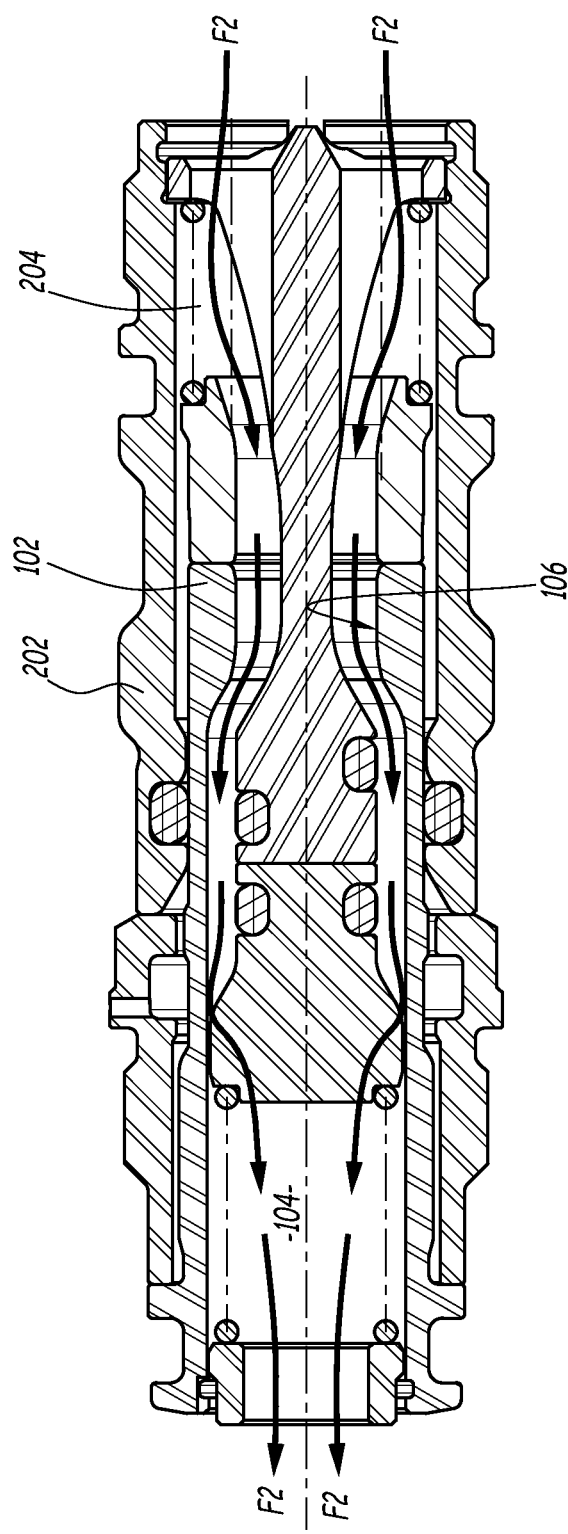
FIG. 6 is a longitudinal sectional view of the coupling in the coupled configuration.
Figure 7:
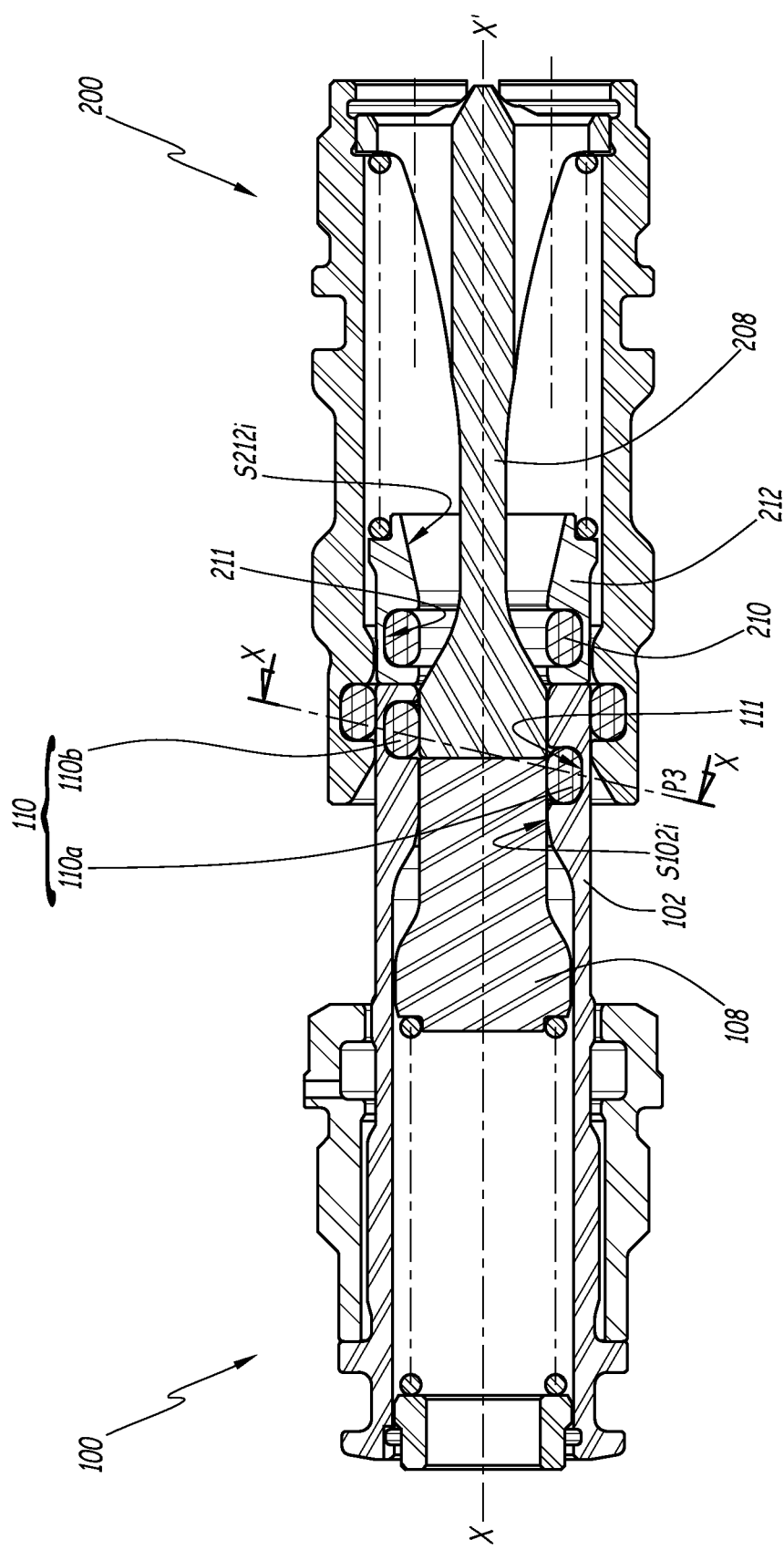
FIG. 7 is a longitudinal sectional view of a coupling according to a second embodiment of the invention, in which the coupling is in a first configuration partway between the uncoupled configuration and a coupled configuration.

The male element 100 also comprises a valve 108 movable axially, i.e., parallel to the axis X100, inside the cavity 104, between a forward position, shown in FIG. 1, in which it closes off the mouth 106 by sealed contact with an inner cylindrical wall S102i of the male body 102, and a withdrawn position, shown in FIG. 6, for example, in which it does not close off the mouth 106.

A return means 116, typically a spring, returns the valve 108 to the forward position. This means that the return means 116 resiliently loads the valve 108 in the forward direction.

The return means 116 is interposed axially between the valve 108 and a stop 118 positioned, inside the body 102, at the rear end.

Advantageously, the male body 102 defines, on its inner radial surface S102i, a seat 122 against which the valve 108 abuts during the return to the forward position, and also in the uncoupled configuration. This seat 122 is formed by a flared surface, converging in the forward direction. It is thus possible, in a variant, to consider a simple shoulder.

Preferably, the valve seat 122 is in the shape of a cone, whereof the apex is oriented forward and the apical angle is close to 60°.

Here, the valve seat 122 separates the cylindrical mouth 106 from the cavity 104, which has a larger diameter.

The male element 100 also comprises a sealing gasket 110, advantageously borne by the valve 108. More specifically, the gasket 110 is mounted inside a peripheral housing, in particular an annular groove 111, defined on the outer radial surface S108e of the valve 108. Here, the sealing gasket 110 is an O-ring (annular and closed).

The sealing gasket 110 provides the sealed closure of the cavity 104 of the male element 100 by sealed contact between the valve 108 and the body 102 during its sealed engagement on its seat 122 and its position on the front face. Advantageously, when the male and female elements are in the uncoupled configuration, the sealing gasket 110 is in sealed contact with the inner cylindrical wall S102i of the male body 102.

Sealing gaskets are also provided between the male body 102 and the downstream plate 114 and between the nut 112 and the male body 102.

Figure 2:
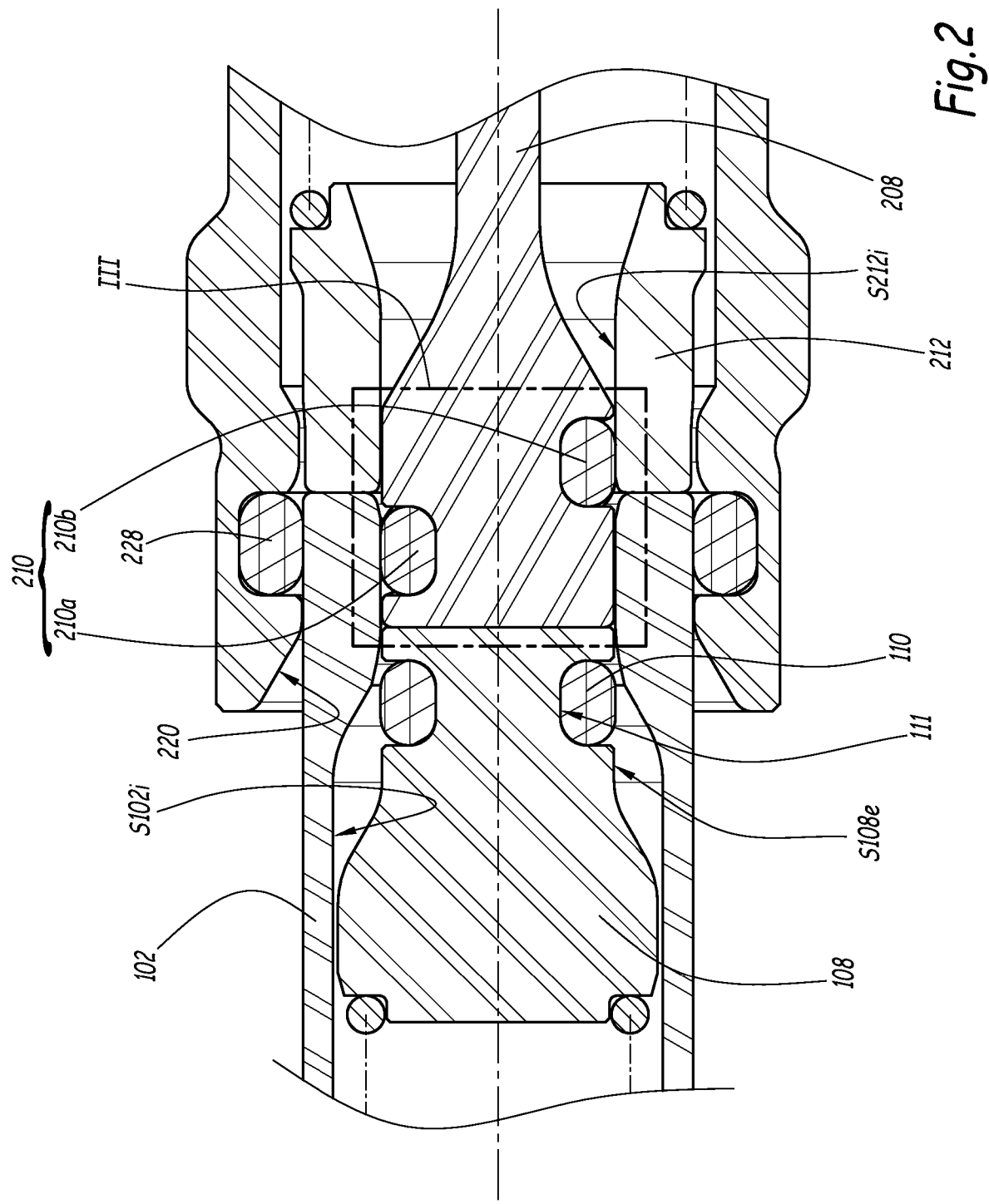
FIG. 2 is a partial sectional view, in the direction of the length, in which the coupling is in a first configuration partway between the uncoupled configuration and a coupled configuration.

As shown in FIG. 2, the female element 200 globally assumes the shape of a cylinder, centered on a longitudinal axis X200.

The female element 200 comprises a cylindrical female body 202, centered on the axis X200 and defining a longitudinal cavity 204 and a distal mouth 206, the diameter D206 of which is smaller than the diameter D204 of the cavity 204.

A push-piece 208 (or piston) is positioned at the center of the female body 202. Advantageously, the push-piece 208 comprises, in front, a push-piece head 216 able to maintain sealed contact with the valve 108 in the uncoupled position of the coupling and, behind, a tubular part 218 (or central rod) whereof the diameter is smaller than that of the head 216. Typically, the push-piece 208 delimits a section 232 that extends the push-piece head 216 in a central rod 218 of smaller diameter.

Advantageously, the section 232 has a frustoconical shape, the apex of which is oriented toward the rear and the angle of which is close to a value of 60°.

A slide valve 212 is arranged radially between the female body 202 and the push-piece 208. This slide valve 212 is axially movable inside the longitudinal cavity 204 between a forward position, shown in FIG. 1, in which it closes off the mouth 206 by sealed contact with an outer cylindrical wall S208e of the push-piece 208 and with an inner cylindrical wall of the female body 202, and a withdrawn position, shown in FIG. 6 for instance, in which it does not close off the mouth 206.

A return means 222, typically a spring, recalls the slide valve 212 to the forward position. This means that the return means 222 resiliently loads the slide valve 212 in the forward direction.

Advantageously, the female body 202 defines, on its inner radial surface, a seat 230 against which the slide valve abuts during the return to the forward position, and also in the uncoupled configuration. This seat 230 is formed by a frustoconical surface, converging in the forward direction. It is thus possible, in a variant, to consider a simple shoulder.

The return means 222 is interposed axially between the slide valve 212 and a stop 224 positioned, inside the body 202, at the rear end between a shoulder of the body 202 and a shank. Preferably, the stop 224 and the push-piece 208 are in one piece.

Figure 3:
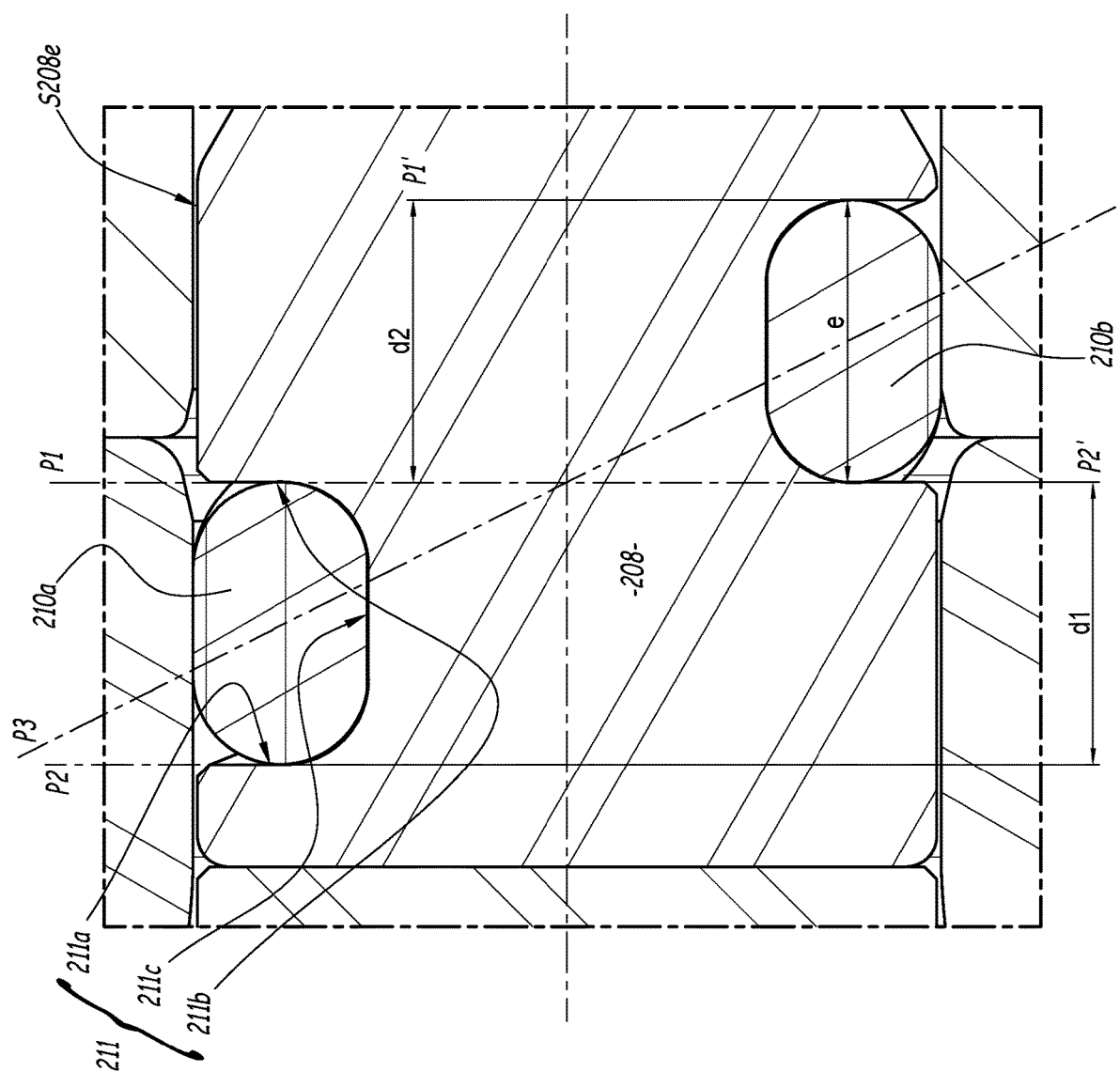
FIG. 3 is a larger scale view of box Ill of FIG. 2.
Figure 4:
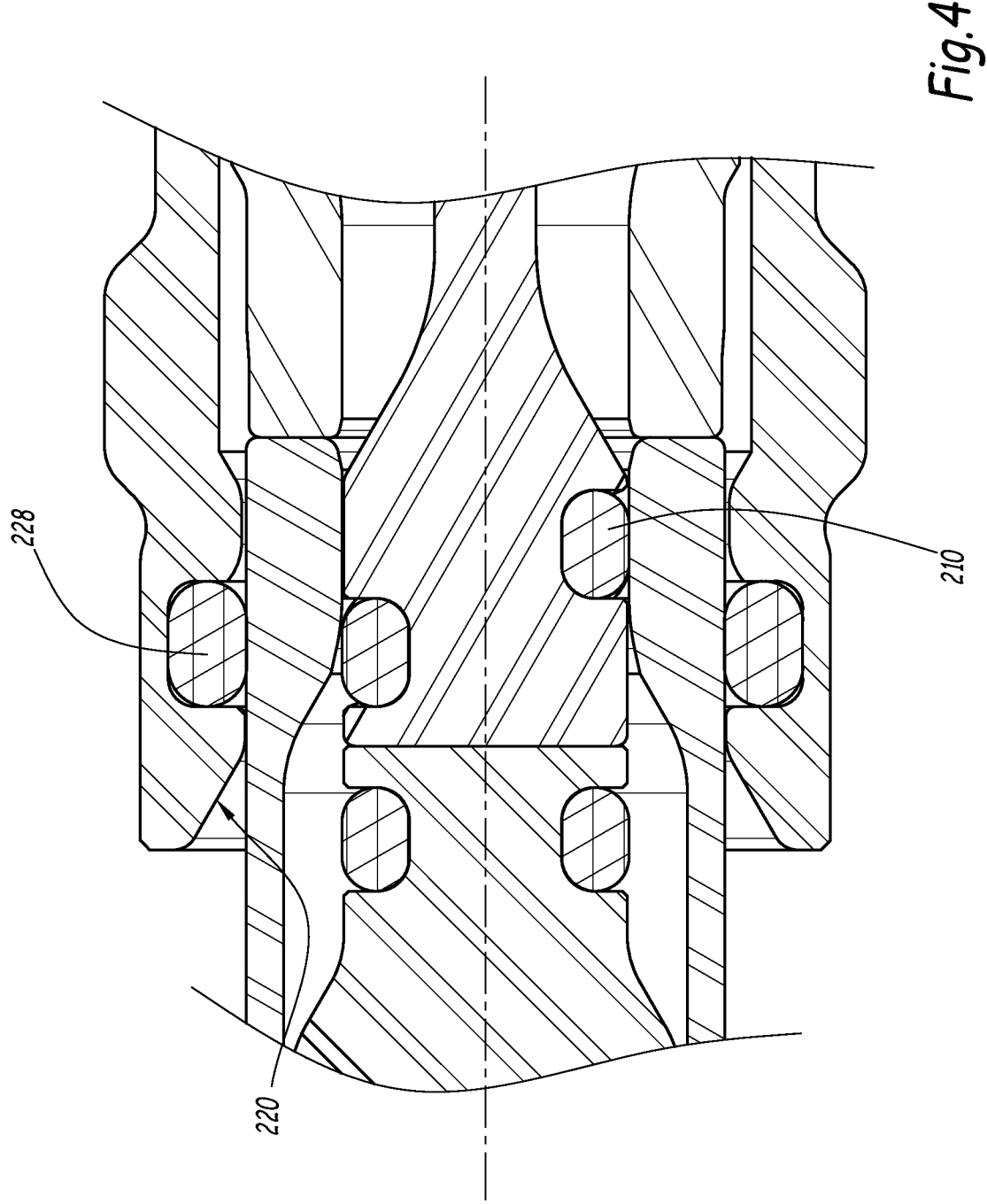
FIG. 4 is a sectional view comparable to that of FIG. 2, in which the coupling is in a second subsequent configuration.

The push-piece 208 advantageously bears a sealing gasket 210. More specifically, the gasket 210 is mounted inside a peripheral housing, in particular an annular groove 211, defined on the outer radial surface S208e of the push-piece 208. As shown in FIG. 3, the peripheral groove 211 is U-shaped, and comprises a distal edge 211a, a proximal edge 211b, and a bottom 211c, substantially flat, extending between the two edge walls 211a and 211b. Of course, other groove sections can be considered.

Preferably, the depth of the groove 211 and/or 111 (measured radially to the longitudinal axis X100 or X200) is identical over its entire circumference.

The distal edge 211a of the peripheral groove 211 extends between two planes P1 and P2 that are perpendicular to the longitudinal axis X200, respectively between a proximal plane P1 and a distal plane P2, which are offset relative to one another by a distance d1 along the longitudinal axis X200. This means that the distal edge 211a is comprised in a volume defined between the planes P1 and P2.

The proximal edge 211b of the peripheral groove 211 extends between two planes P1 and P2 that are perpendicular to the longitudinal axis X200, respectively between a proximal plane P1 and a distal plane P2, which are offset relative to one another by a distance d2 along the longitudinal axis X200. This means that the proximal edge 211b is comprised in a volume defined between the planes P1' and P2'.

Therefore, and as shown in FIG. 3, the peripheral groove 211 has an elliptical shape in an oblique plane P3 relative to a plane perpendicular to the longitudinal axis X200, such as the plane P1 or P2, of the coupling element 200. As a result, the sealing gasket 210 is housed in an elliptical groove. Typically, an angle of about 15° exists relative to a plane perpendicular to the axis X100 or X200.

Advantageously, the groove 211 is made by milling while rotating and translating a shaft (blank of the push-piece 208) to give the groove 211 the desired curve or incline.

According to one preferred embodiment, the distance d1 and/or d2 corresponds to at least a toroid thickness e of the sealing gasket 210. Still more advantageously, the distance d1 and/or d2 corresponds to one, two, three or four toroid thicknesses e. The toroid thickness e is measured parallel to the longitudinal axis X200.

In this document, the terms "sector", "segment", "angular sector" or "circular segment" refer with the same meaning to an arc of circle, a portion, a section, or an angular part of a gasket or groove (of revolution, circular, toroidal). This is therefore a subpart of an elastomeric gasket (or groove), i.e., of a sample of its perimeter.

As shown in FIG. 3, the proximal 211b or distal 211a edge of the peripheral groove 211 comprises two sections (not referenced) positioned relative to one another at a distance, measured parallel to the axis X200, identical to the distance d1 between the proximal plane P1 and the distal plane P2. These two sections are positioned diametrically opposite one another.

Here, the planes P1 and P2 or P1' and P2' of the edges of the sectors 180 opposite are in fact separated by a gasket thickness e relative to the main axis of the element: d1 for the distal edge 211a, d2 for the proximal edge 211b.

Advantageously, and as shown in FIGS. 1 and 2, the slide valve 212, in the forward position, closes off the mouth 206 by sealed contact between the sealing gasket 210 and an inner cylindrical wall S212i of the slide valve 212 and by sealed contact between an O-ring 228 and an outer cylindrical wall of the slide valve 212. In other words, the sealing gasket 210 provides the sealing of the mouth 206 in contact with the inner cylindrical wall S212i of the slide valve 212.

Preferably, the female body 202 comprises a front end whereof the inner radial surface 220 (visible in FIG. 2 in particular) is frustoconical and flared in the forward direction. This funnel shape facilitates the fitting of the female element 200 around the male element 100 during the coupling, and in particular at the beginning, during the approach of the two coupling elements.

Advantageously, the front faces of the male body 102 and the valve 108, as well as the front faces of the push-piece 208 and the slide valve 212, are coplanar when the male and female elements are in the uncoupled configuration. This is referred to as a coupling with a planar face or flush faces. Nevertheless, it is obvious that the invention also applies to other types of couplings (see the last embodiment of the invention).

In the example, the push-piece 208 and the valve 108 include a solid part with a conical flare open in the rear part. In other words, the push-piece 208 and the valve 108 each comprise at least one opening or a slot, through which the fluid circulates in the coupled configuration of the coupling. Typically, the push-piece 208 comprises, in the rear part, several longitudinal openings 226. The openings of the valve 108 are not visible in the section planes of the figures.

Preferably, the O-ring 228 is positioned inside an annular groove delimited by the inner radial surface of the female body 202. In the uncoupled position of the coupling (see FIG. 1), when the slide valve 212 bears on the seat 230 of the body 202, the gasket 228 provides the sealing between the slide valve 212 and the body 202 by sealed contact with the outer cylindrical wall of the slide valve 212.

Therefore, the gasket 210 is substantially in the same plane as the gasket 228, such that the two gaskets perform their sealing function at the same time during the separation of the two coupling elements 100 and 200 and the fluid communication between the two coupling elements is closed in a time.

Hereinafter, the operation of the coupling is described, in particular the coupling phase of the male and female coupling elements 100 and 200.

In the uncoupled position, the movable closing members of each of the male and female elements, respectively the valve 108 and the slide valve 212, sealably close off the cavities (or enclosures) 104 and 204 of the elements. Specifically, regarding the male element, the sealing barrier before the placement in communication, or connection, of the enclosures 104 and 204 is a curved and closed, typically circular, sealing section between the body 102 and the valve 108. Regarding the female element, the sealing barrier before the placement in communication, or connection, of the enclosures 104 and 204 is formed by two sealing sections, also curved and closed, respectively between the slide valve 212 and the push-piece 208 and between the slide valve 212 and the female body 202. Specifically, the sealing section between the push-piece 208 and the slide valve 212, embodied by the gasket 210, is elliptical, while the sealing section between the slide valve 212 and the female body 202, embodied by the gasket 228, is circular.

The first phase of the coupling consists of bringing the elements 100 and 200 close to one another, and in particular bringing the distal ends of the two elements close to one another. In the preferred embodiment of the figures, the coupling elements 100 and 200 can be coupled to one another irrespective of the relative angular indexing (or orientation) between the two coupling elements.

Hereinafter, the male body 102 penetrates inside the female body 202, with guiding along the inner radial surface 220. The axes X100 and X200 are then superimposed with the longitudinal axis X-X'. Therefore, the guiding remains guaranteed in the same manner as the couplings of the state of the art.

By coupling the two elements 100 and 200 along the fitting axis X-X', the component members of the two coupling elements push one another back while maintaining the sealing of each of the enclosures 104 and 204. The valve member 108 is movable relative to the male body member for the male element, and the slide valve member 212 is movable relative to the female body 202 and push-piece 208 members for the female element, according to kinematics known from the state of the art. Specifically, the push-piece 208 pushes the valve 108, while the slide valve 212 is pushed back by the male body 102. The coupling then successively enters the configurations of FIGS. 2 and 4. Typically, in these two configurations, a distal portion 210a of the gasket 210 is still in contact with the inner cylindrical wall S102i of the male body 102. Therefore, the fluid does not circulate between the two coupling elements 100 and 200.

In particular, the distal plane P2' of the proximal edge of the groove 211 is also in the mouth 106 of the male body 102, such that one also sees a closed sealing section, in particular elliptical, between the push-piece 208 and the male body 102.

Figure 5:
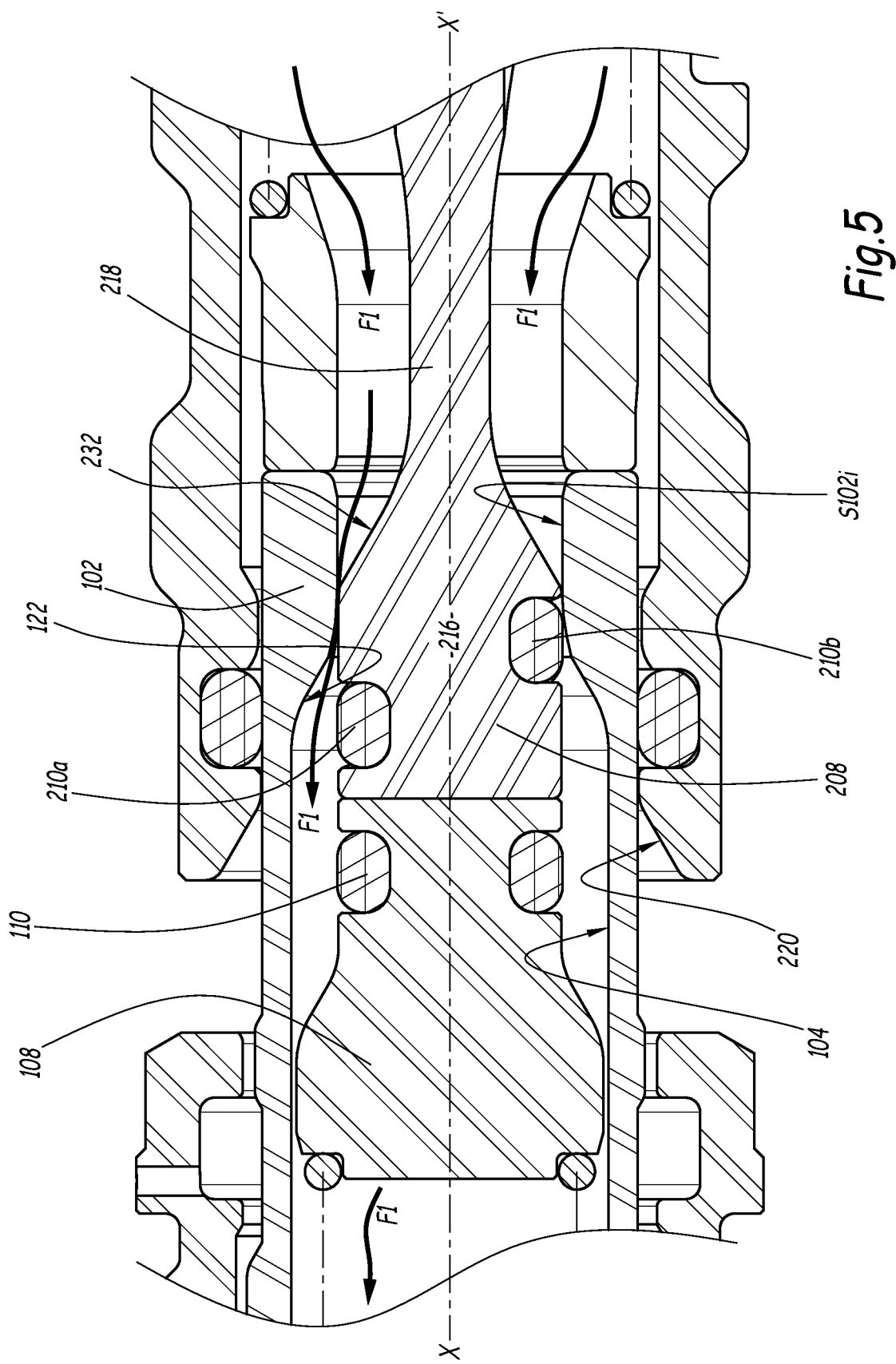
FIG. 5 is a sectional view comparable to that of FIGS. 2 and 4, in which the coupling is in a third intermediate configuration, called balancing configuration, between the uncoupled configuration and the coupled configuration.

The continued coupling brings the coupling into a so-called balancing position, shown in FIG. 5. This balancing configuration is defined between the coupled configuration (shown in FIG. 6) and the uncoupled configuration (shown in FIG. 1).

In this balancing configuration, the sealing gasket 210 comprises a rear portion 210b that is in sealed contact with the inner cylindrical wall S102i of the male body 102 and a front portion 210a that is not in sealed contact with the inner cylindrical wall S102i of the male body 102, such that a fluid connection (see arrows F1 in FIG. 5) is formed between the cavities 104 and 204 of the male and female elements. Therefore, the distal plane P2' of the proximal edge 211b of the peripheral groove is no longer in the mouth 106 of the male body 102, but in the cavity 104, which causes the front portion 210a of the gasket no longer to be in sealed contact with the inner wall S102i of the male body 102. Conversely, the proximal plane P1' of the proximal edge 211b of the groove 211 is still in the mouth 106, such that at least part of the gasket 210, in the case at hand the rear part 210b of the gasket 210, is still in sealed contact with the inner wall S102i of the male body 102.

The fluid passes in the radial play, necessary to the operation of the coupling, between the outer cylindrical wall of the push-piece 208 and the inner cylindrical wall of the male body 102.

Therefore, in the balancing configuration, the inner cylindrical wall S102i of the male body 102 radially retains the rear portion 210b of the sealing gasket 210, the front portion 210a of the sealing gasket 210 not being radially retained. This means that there is no passage of fluid at the rear portion 210b of the gasket 210. Conversely, the fluid can pass around the front portion 210a of the gasket 210.

Specifically, the contact between the rear portion 210b of the sealing gasket 210 and the male body 102 is a linear contact.

Advantageously, the fluid connection between the cavities 104 and 204 of the male and female elements is done, upon balancing, sealably relative to the outside, i.e., without leaks to the outside of the assembly formed by the coupling and the two pipes C1 and C2.

Preferably, in the balancing configuration, the inner cylindrical wall S102i of the male body 102 retains (or keeps) the sealing gasket 210 partially in the radial direction. The coupling therefore establishes the pressure while at least one annular segment of the gasket 210 is still in contact with the inner cylindrical wall S102i of the male body 102. In other words, the last gasket 210 providing the sealing of the cavities 104 and 204 is locally maintained during the balancing phase.

Advantageously, and as shown in FIG. 5, the seat 122 of the cavity 104 of the male body 102 is inclined so as to allow a regular increase in the passage section between the gasket segment 210 and the conical section 122 upon coupling, while an angular segment (rear segment) of the gasket 210 is maintained. In a variant, this increase of the passage section comes from the incline of the frustoconical section 232 connecting the head 216 of the central piston (or push-piece) 208 to the rod 218.

The continuation of the coupling movement brings the coupling into the coupled position shown in FIG. 6. In this position, the fluid stream is established (see arrows F2). The gaskets 110 and 210 are exposed to the fluid stream. The critical communication phase having been done with retention of the gasket 210, the gaskets can be exposed to the flow rate of the fluid stream without risking being ejected. Thus, the gasket 210 does not resume sealing after the balancing configuration, unlike the known solutions with gasket protection that do not optimize the passage of fluid and make the structure of the coupling more complex. From the end of the balancing phase, the gasket 210 remains exposed to the fluid stream.

In the specific example considered here, the execution speed of the coupling can affect the pressurization phase of the pipe downstream C1. Thus, it can be advantageous to increase the gap between the planes P1 and P2 (or P1' and P2') of the elliptical gasket 210 by a distance greater than the thickness e of the gasket 210 in order to guarantee a retaining/balancing phase before complete opening for larger gasket diameters. The features of the gasket and the groove are thus chosen based on the targeted application, in particular the distance d1 and/or d2.

FIGS. 7 to 11 show a second embodiment of the invention. Below, only the differences with respect to the first embodiment are described in the interest of concision. Therefore, the same numerical references are used.

This second embodiment is the "mirror image" solution of the first embodiment. Indeed, the gaskets 110 and 210 are housed inside inner peripheral grooves, respectively 111 and 211, provided in front of the coupling elements 100 and 200. Specifically, said grooves 111 and 211 are defined on the inner radial surface S102i of the male body 102 and on the inner radial surface S212i of the slide valve 212.

Figure 8:
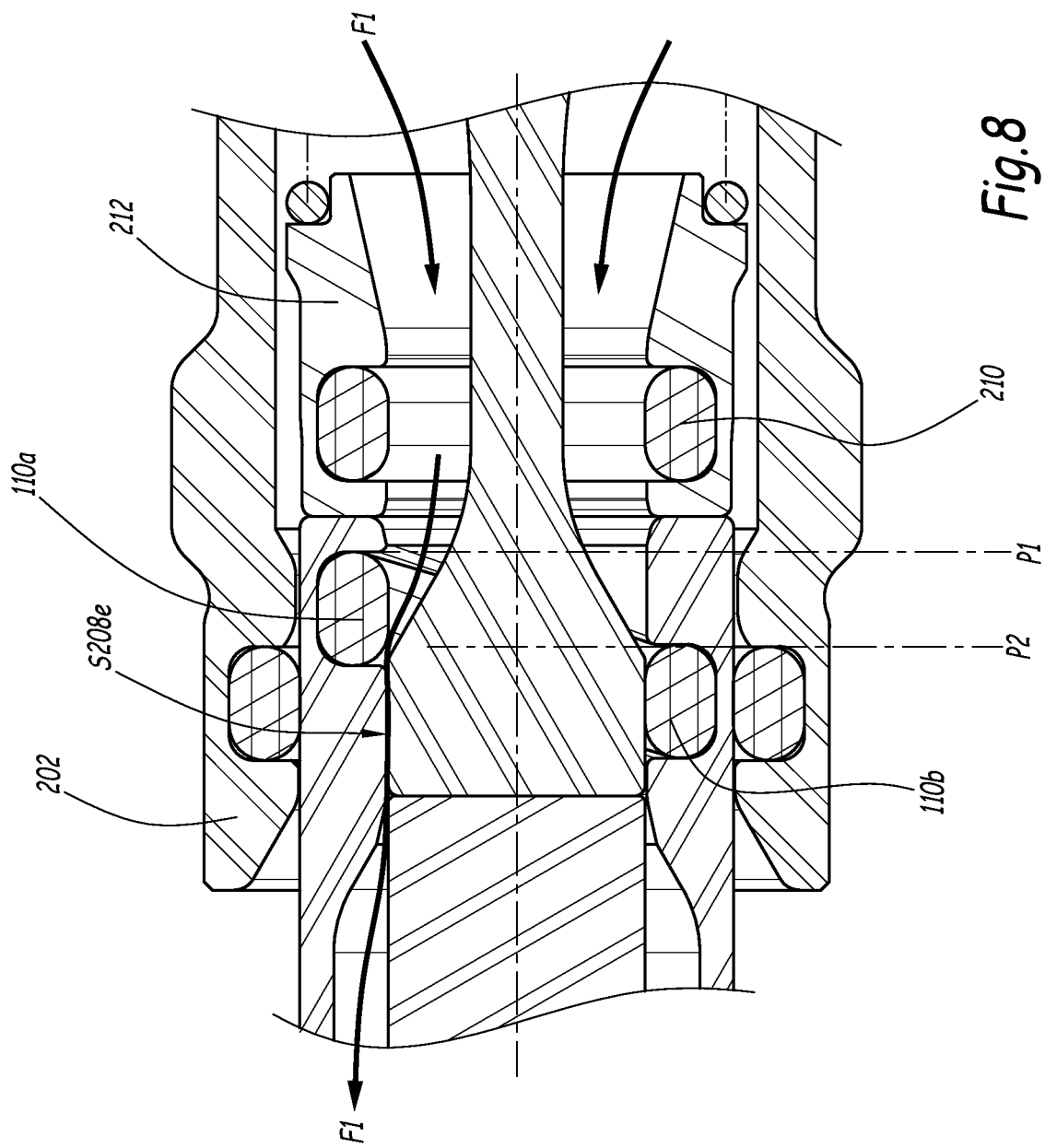
FIG. 8 is a partial sectional view, in the direction of the length, in which the coupling of FIG. 7 is in a second subsequent configuration, called balancing configuration, between the uncoupled configuration and a coupled configuration.

In this embodiment, and in particular in the balancing configuration shown in FIG. 8, the sealing gasket 110 comprises a rear portion 110b that is in sealed contact with the outer cylindrical wall S208e of the male body 208 and a front (or distal) portion 110a that is not in sealed contact with the outer cylindrical wall S208e of the central push-piece 208, such that a fluid connection is formed between the cavities 104 and 204 of the male and female elements (see arrows F1).

Specifically, the contact between the rear portion 110b of the sealing gasket 110 and the central push-piece 208 is a linear contact.

Therefore, in the balancing configuration (see FIG. 8), the outer cylindrical wall S208e of the central push-piece 208 radially retains the rear portion 110b of the sealing gasket 110, the front portion 110a not being radially retained.

Figure 9:
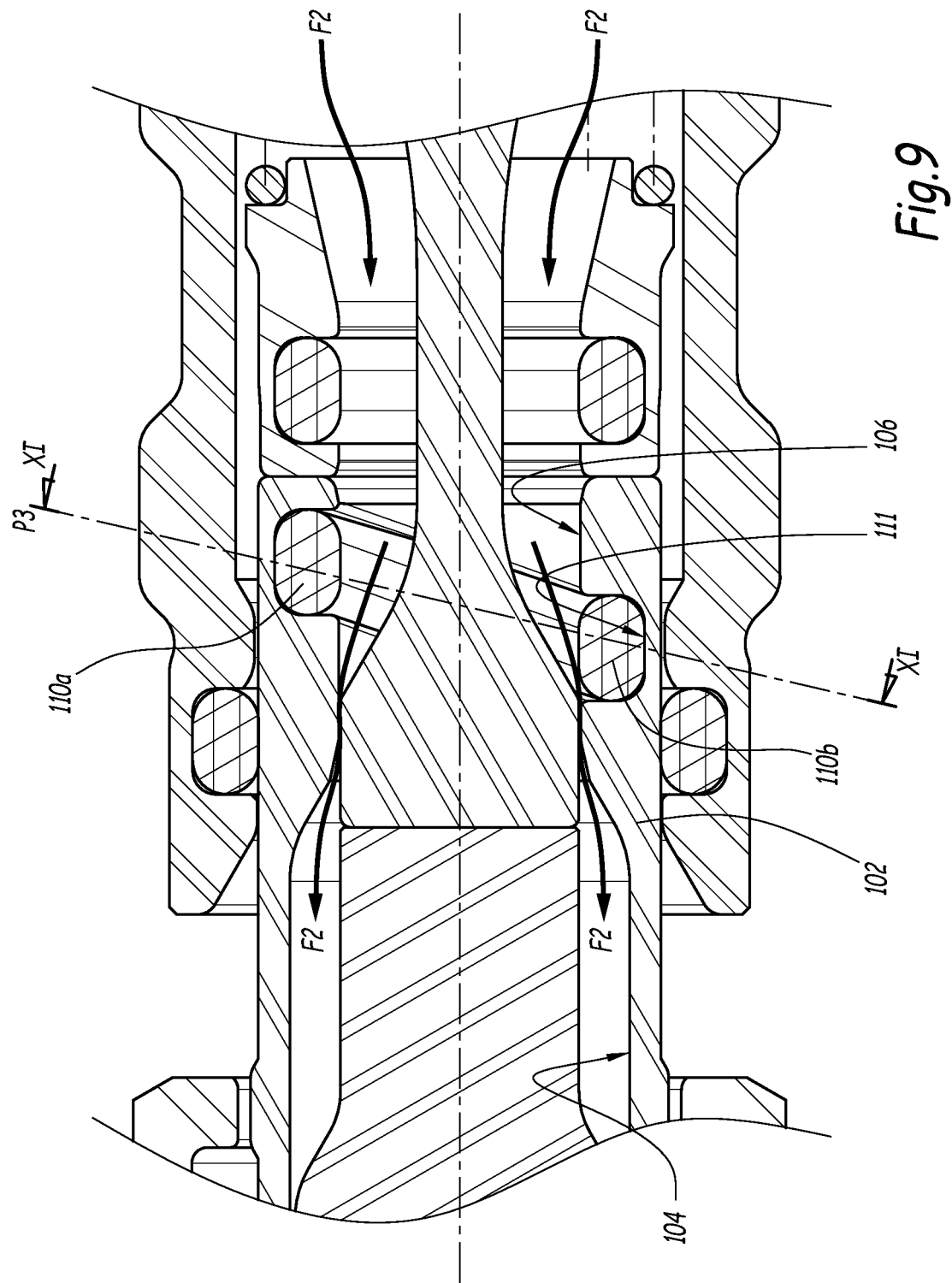
FIG. 9 is a sectional view comparable to that of FIG. 8, in which the coupling of FIG. 7 is in a coupled or near-coupled configuration.
Figure 10:
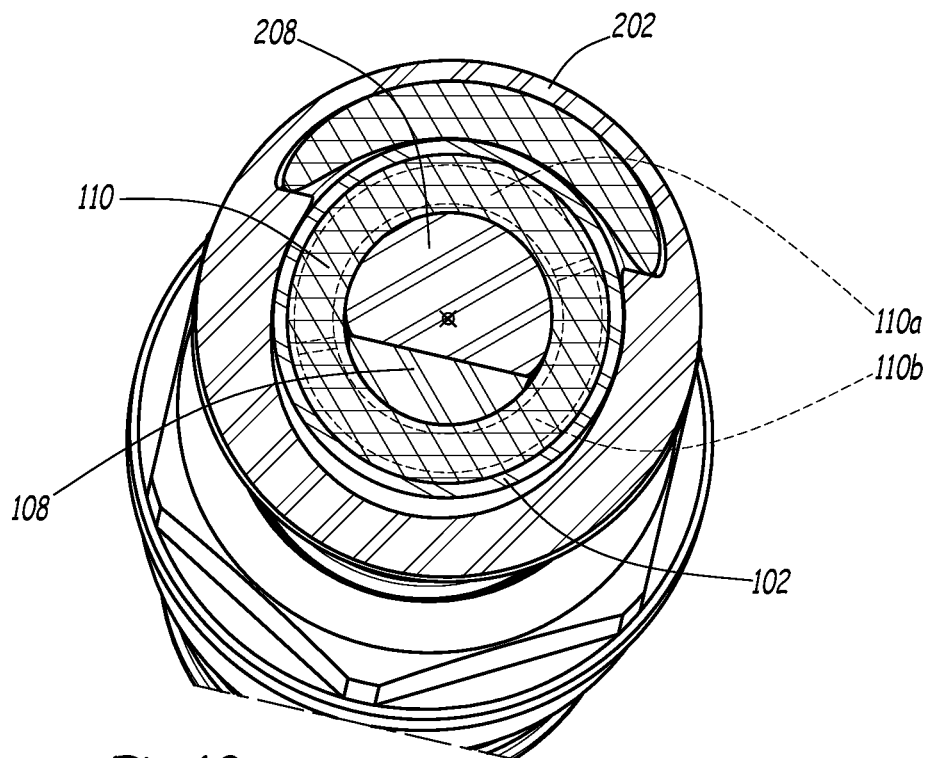
FIGS. 10 and 11 are sectional views, respectively in plane X-X and XI-XI of FIGS. 7 and 9.
Figure 11:
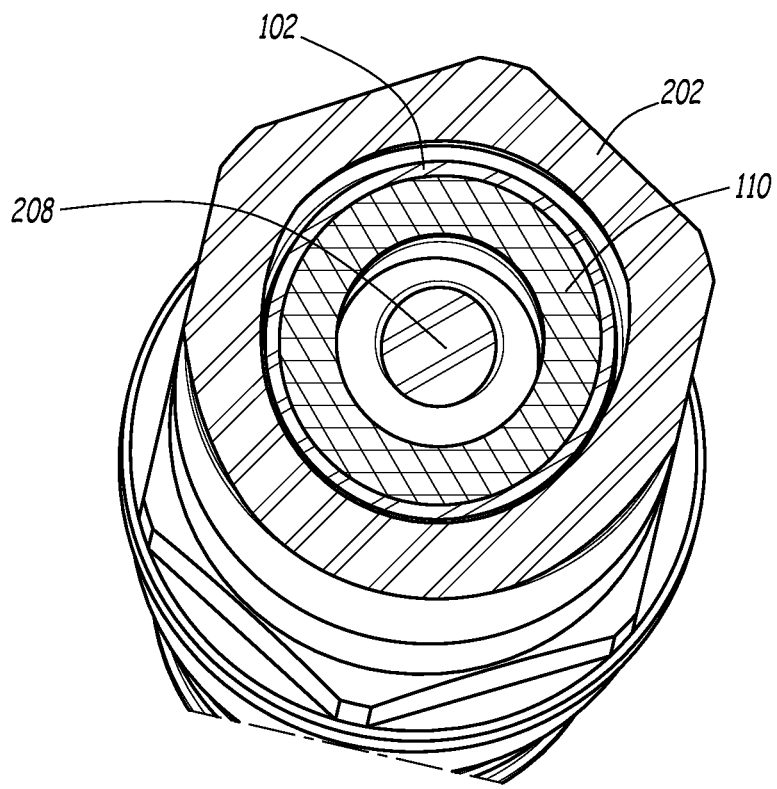
Figure 12:
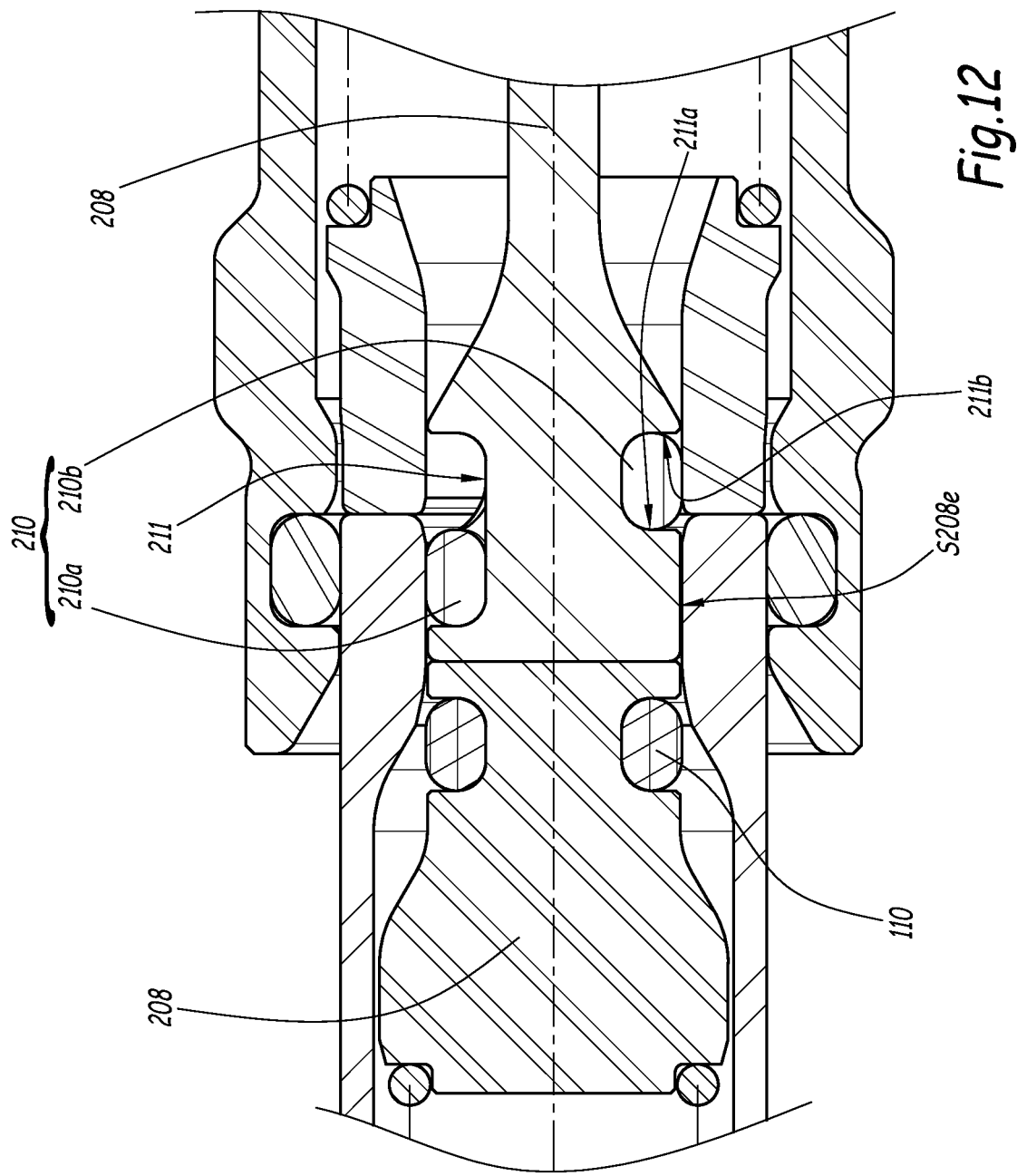
FIG. 12 is a partial sectional view, comparable to that of FIG. 8, showing a coupling according to a third embodiment of the invention, and in which the coupling is in a first configuration partway between an uncoupled configuration and a coupled configuration.

In FIG. 9, the gasket 110 is no longer in contact at all with the outer wall of the push-piece 208. Therefore, the fluid is free to circulate (see arrows F2) and the radial play between the push-piece 208 and the male body 102: the coupling is nearly coupled to establish the full passage.

FIGS. 12 to 15 show a third embodiment of the invention. Below, only the differences with respect to the preceding embodiments are described in the interest of concision. Therefore, the same numerical references are used.

This embodiment can be considered a variant of the first embodiment. Specifically, the only difference in fact relates to the shape of the groove 211 receiving the elliptical gasket 210: The proximal edge 211b of the groove 211 extends in (or is contained in) a plane perpendicular to the longitudinal axis X200 of the coupling element 200. As shown in FIG. 13, the distal edge 211a, conversely, indeed extends between two planes that are perpendicular to the longitudinal axis, respectively between a proximal plane P1 and a distal plane P2, which are offset relative to one another along the longitudinal axis.

Therefore, the width of the groove 211, i.e., the distance between the edges 211a and 211b, measured in the longitudinal direction, is variable, and therefore not, like in the first embodiment, constant.

In this embodiment in particular, the gasket 210 can extend in a plane normal to the axis X200 in the absence of pressure in the enclosure 204 of the element 200 but, during operation, it will be positioned obliquely, in support on the milled profile of the groove 210, against the pressure force.

Advantageously, the milled groove 211 is made by rotating the shaft (serving as blank to produce the part 208) by 90° around its main axis, between several milling phases.

According to a variant that is not shown, close to the third embodiment, the outer groove 211 of the push-piece head 216 can be cylindrical (and no longer elliptical). Therefore, an O-ring with a thickness smaller than the width of the groove is placed in the groove. A pin is placed in the front part of the groove to keep an angular sector of the gasket against the cylindrical wall of the body, while a front sector of the gasket appears in the enclosure of the male body and a fortiori in the fluid tunnel. The pressure of the fluid tends to push back the part of the gasket not laterally stressed by the pin, toward the front of the groove, in the plane normal to the axis that passes through the pin. The gasket is therefore movable in its groove, the width of which also makes it possible to provide the sealed closing of the female element. This embodiment makes it possible to circulate the fluid from the female body toward the male body, or in the opposite direction.

Alternatively, any other mechanical member, such as an attached ring, can be used to provide a back-pressure on the gasket. Typically, a ring attached in a cylindrical groove or a head attached with an elliptical shape could be suitable to create the shift between the distal and proximal planes, and to produce the same effect.

Figure 16:
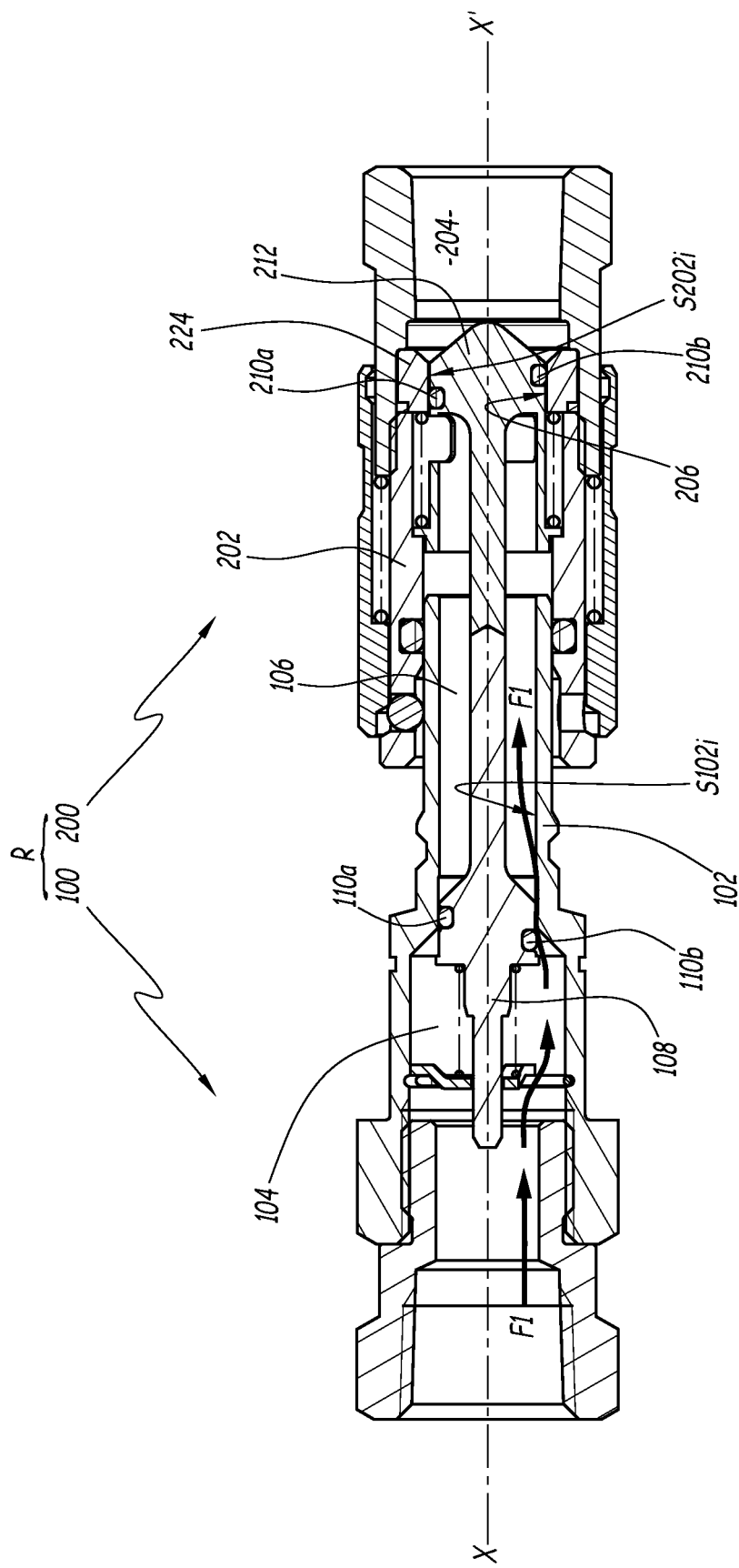
FIGS. 16 and 17 are two longitudinal sectional views of a coupling according to a fourth embodiment of the invention, which show the coupling in two configurations, respectively in a substantially uncoupled configuration and in an intermediate configuration, called balancing configuration, between the uncoupled configuration and a coupled configuration.
Figure 17:
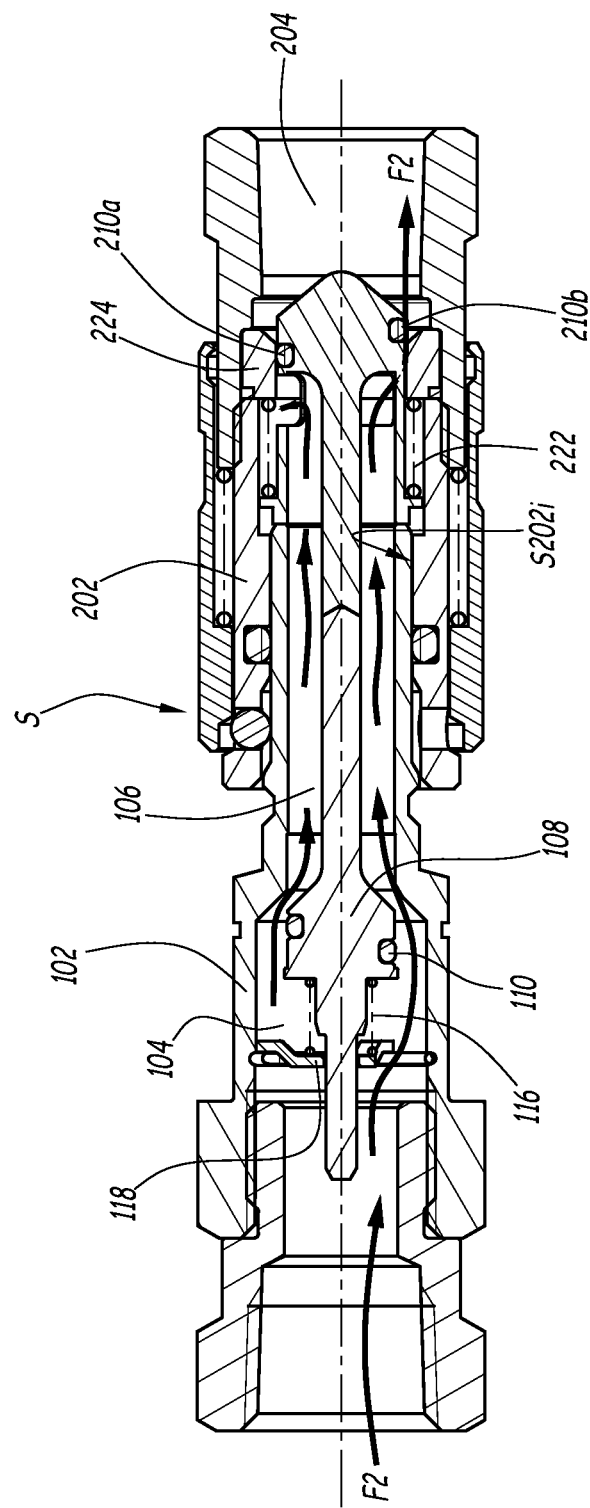

FIGS. 16 and 17 shows a fourth embodiment of the invention. Below, only the differences with respect to the preceding embodiments are described in the interest of concision. Therefore, the same numerical references are used.

In this embodiment, the female element 200 does not include a push-piece in the sense that it was previously defined. Therefore, the slide valve 212 is axially movable inside the longitudinal cavity 204 between a forward position, in which it closes off the mouth 206 by sealed contact between a second sealing gasket 210 and an inner cylindrical wall S202i of the female body 202, and a withdrawn position in which it does not close off the mouth 206.

Specifically, the slide valve 212 is movable inside the female body 202 against the resilient force of a spring 222. The spring 222 resiliently loads the slide valve 212 in the forward direction. The spring 222 is interposed between a flange of the slide valve 212 and a stop 224, which forms a part of the female body 202. In the example, the stop 224 is mounted on the two-part body 202 (screwed). In a variant, the stop 224 could be secured to one of the two parts of the body 202.

The stop 224 is provided behind the body 202, and in particular behind the flange of the slide valve 212.

The gasket 210 is housed inside a peripheral groove formed on an outer cylindrical wall of the slide valve 212.

The gasket 110 is housed inside a peripheral groove formed on an outer cylindrical wall of the valve 108.

In this embodiment, each of the two peripheral grooves mentioned above has an elliptical shape in an oblique plane relative to a plane perpendicular to a longitudinal axis X-X' of the coupling. Therefore, the proximal and/or distal edge of each peripheral groove extends between two planes that are perpendicular to the longitudinal axis, respectively between a proximal plane and a distal plane, which are offset relative to one another along the longitudinal axis X-X'.

As a result, the gaskets 110 and 210 are both placed in their respective groove with an elliptical shape.

The slide valve 212 has a coaxial shape: it comprises an inner cylinder and an outer cylinder arranged coaxially around the inner cylinder. The inner cylinder cooperates with the valve 108 for the coupling, while the outer cylinder comprises at least one radial fluid passage opening in front of the gasket 210.

Also in this embodiment, the coupling comprises a system for locking the male and female elements, respectively 100 and 200, in the coupled configuration, and in particular a ball locking system. In the example, the male body 102 delimits, on its periphery, an outer groove suitable for receiving locking balls housed in piercings of the female body 202.

According to a variant of this fourth embodiment that is not shown, the gasket 210 could be borne by the female body 202, or at least by the stop 224 belonging to the female body. Specifically, the gasket 210 would be positioned inside the housing provided on an inner cylindrical wall of the body 202 (here of the stop 228).

Hereinafter, the operation of the coupling of FIGS. 16 and 17 is described, in particular the coupling phase of the male and female coupling elements 100 and 200.

In the uncoupled position, the movable closing members of each of the male and female elements, respectively the valve 108 and the slide valve 212, sealably close off the cavities (or enclosures) 104 and 204 of the elements. Specifically, regarding the male element, the sealing barrier before the placement in communication, or connection, of the enclosures 104 and 204 is a curved and closed, typically elliptical, sealing section between the body 102 and the valve 108. Regarding the female element, the sealing barrier before the placement in communication, or connection, of the enclosures 104 and 204 is formed by a sealing section, also curved and closed, typically elliptical, respectively between the slide valve 212 and the female body 202.

The uncoupled position is not shown for this embodiment.

By coupling the two elements 100 and 200 along the fitting axis X-X', the component members of the two coupling elements push one another back while maintaining the sealing of each of the enclosures 104 and 204. Specifically, the valve 108 and the slide valve 212 push one another back toward the rear, thus compressing their respective return spring 116 and 222.

The coupling then goes from the completely uncoupled configuration to the configuration of FIG. 16. In this configuration, a distal (or front) portion 110a of the gasket 110 is still in contact with the inner cylindrical wall S102i of the male body 102. Conversely, a proximal (or rear) portion of the gasket 110 is no longer in sealed contact with the inner cylindrical wall S102i of the male body 102. The male coupling element 100 is therefore no longer sealed, as shown by the arrows F1 symbolizing the passage of fluid through the coupling and the balancing passage.

However, the gasket 210 is still fully in sealed contact with the inner cylindrical wall of the female body, and in particular with the inner cylindrical wall of the stop 224 (belonging to the female body). Therefore, the fluid does not circulate between the two coupling elements 100 and 200.

The continued coupling brings the coupling into the so-called balancing position, shown in FIG. 17.

In this balancing configuration, the sealing gasket 210 comprises a front portion 210a that is in sealed contact with the inner cylindrical wall S202i of the female body 202 and a rear portion 210b that is no longer in sealed contact with the inner cylindrical wall S202i of the female body 202, such that a fluid connection (see arrows F2 in FIG. 17) is formed between the cavities 104 and 204 of the male and female elements.

Therefore, in the balancing configuration, the inner cylindrical wall S202i of the female body 202 radially retains the front portion 210a of the sealing gasket 210, the rear portion 210b of the sealing gasket 210 not being radially retained.

The continuation of the coupling movement brings the coupling into the coupled position (not shown), in which the fluid stream is established. The gaskets 110 and 210 are exposed to the fluid stream. The critical communication phase having been done with retention of the gasket 210, the gaskets can be exposed to the flow rate of the fluid stream without risking being ejected. Thus, the gasket 210 does not resume sealing after the balancing configuration, unlike the known solutions with gasket protection that do not optimize the passage of fluid and make the structure of the coupling more complex. From the end of the balancing phase, the gasket 210 remains exposed to the fluid stream.

The uncertainty regarding the opening sequence of the valves 108 and 212 justifies the use of two elliptical grooves, respectively one on each coupling element, since these guarantee a connection of the ducts C1 and C2 with a controlled leak, without gasket ejection risk irrespective of the opening order of the valves. The male valve being able to be pushed back and to bear on its rear seat before the opening of the fluid connection or after the opening of the connection, and the female valve also being able to be pushed back against the stop 224 before the opening of the fluid connection or after the opening, with the retention of the gasket 110 and/or 210 in the balancing phase. Additionally, this embodiment is suitable for an application where both circulation directions can be used selectively.

In a variant that is not shown, it is possible to consider grooves with sinusoidal/undulating, zigzag or other shapes, for which the sealing section is not contained in a plane orthogonal to the longitudinal axis of the coupling. In other words, the groove of the first or the second gasket, respectively 110 or 210, has an undulating shape, while extending between two planes normal to the axis of the coupling and that are distant. Additionally, the gasket 110 or 210 can have an undulating, zigzag or other shape than toroidal. The contact of the gasket can then be done in several linear segments, and not annularly.

Therefore, depending on the shape of the housing 111 or 211, the gasket 110 or 210 can have several angular sectors in the fluid stream while several angular sectors are still retained by a contact surface.

According to another variant that is not shown, the balancing configuration is achieved with an elliptical push-piece 208 gasket 210 that overlaps both the female slide valve 212 and the male body 102, the distal plane of the gasket having reached the sealing seat of the male valve 108 and a diameter larger than the gasket. This principle is applicable to all of the embodiments of the invention. It is in particular met when the planes defining the elliptical groove are spaced apart at least by two toroid thicknesses and/or if the surface in contact with the valve gasket is not very axially extensive: the gasket loses an angular contact sector with the male body, while another annular sector is still in contact with the slide valve 212.

According to another variant, the central push-piece 208 of the female element is hollow and comprises at least one radial opening.

According to another variant that is not shown, the coupling R is of the coaxial type, for fluid conduit applications between two coaxial coupling elements.

According to another variant that is not shown, the gaskets 110 and 210, inter alia, of the coupling R can be overmolded gaskets, or adhered by overmolding.

According to another variant that is not shown, the diameters D204 and D206, respectively of the cavity 204 and the distal mouth 206 of the female body 202, are equal.

The features of the embodiments of the figures and the variants not shown considered above may be combined with one another to create new embodiments of the invention.

The invention claimed is:

1. A quick coupling for the detachable connection of two pipes through which a pressurized fluid flows, made up of a male element and a female element able to receive the male element by fitting along a longitudinal axis between an uncoupled configuration and a coupled configuration, the male element comprising:
  a cylindrical male body, defining a longitudinal cavity and a distal mouth, the diameter of which is smaller than that of the cavity,
  a valve movable axially inside the cavity, between a forward position in which the valve closes off the mouth and a withdrawn position in which the valve does not close off the mouth, and
  a first sealing gasket, which is borne by the valve or the male body, and which bears respectively on an inner cylindrical wall of the male body or on an outer cylindrical wall of the valve, when the valve is in the forward position, and the female coupling element comprising:
  a cylindrical female body, defining a longitudinal cavity and a distal mouth, the diameter of which is smaller than or equal to that of the cavity,
  a slide valve, which is movable axially inside the longitudinal cavity between a forward position, in which the slide valve closes off the mouth, and a withdrawn position, in which the slide valve does not close off the mouth, and a second sealing gasket, which is borne by a member from among a central push-piece secured to the female body, the slide valve or the female body and which bears on another member from among the slide valve, the push-piece or the female body, when the slide valve is in the forward position, wherein:

the male element comprises a first peripheral groove, comprising a first distal edge, a first proximal edge and a first bottom, the first sealing gasket being housed inside the first peripheral groove, and/or the female element comprises a second peripheral groove, comprising a second distal edge, a second proximal edge and a second bottom, the second sealing gasket being housed inside the second peripheral groove, the first proximal edge, the second proximal edge, the first distal edge or the second distal edge extends between two planes that are perpendicular to a longitudinal axis of the male or female element, respectively between a proximal plane and a distal plane, which are offset relative to one another along the longitudinal axis.

2. The quick coupler according to claim 1, wherein the two proximal and distal planes are offset from one another by a distance corresponding to one, two, three or four toroid thicknesses of the first or the second sealing gasket.

3. The quick coupling according to claim 1, wherein the first proximal edge, the second proximal edge, the first distal edge or the second distal edge comprises two sections positioned relative to one another at a distance, measured parallel to the longitudinal axis, identical to the distance between the proximal plane and the distal plane, and wherein these two sections are positioned diametrically opposite one another.

4. The quick coupling according to claim 1, wherein the slide valve is positioned radially between the female body and the central push-piece secured to the female body.

5. The quick coupling according to claim 1, wherein the first sealing gasket is borne by the male body or the valve, while the second sealing gasket is borne by the slide valve or the central push-piece.

6. The quick coupling according to claim 1, wherein in a balancing configuration, defined between the uncoupled configuration and the coupled configuration of the coupling, the second sealing gasket comprises a rear portion that is in sealed contact with the inner cylindrical wall of the male body and a front portion that is not in sealed contact with the inner cylindrical wall of the male body, such that a fluid connection is formed between the cavities of the male and female elements.

7. The quick coupling according to claim 6, wherein the inner cylindrical wall of the male body is able to radially retain the rear portion of the second sealing gasket in the balancing configuration, the front portion of the second sealing gasket not being radially retained.

8. The quick coupling according to claim 1, wherein in a balancing configuration, defined between the uncoupled configuration and the coupled configuration of the coupling, the first sealing gasket comprises a rear portion that is in sealed contact with an outer cylindrical wall of the central push-piece and a front portion that is not in sealed contact with the outer cylindrical wall of the central push-piece, such that a fluid connection is formed between the cavities of the male and female elements.

9. The quick coupling according to claim 8, wherein the rear portion of the first sealing gasket is radially retained by the outer cylindrical wall of the central push-piece in the balancing configuration, the front portion of the first sealing gasket not being radially retained.

10. The quick coupling according to claim 6, wherein the contact between the rear portion of the second sealing gasket and the male body, is a linear contact.

11. The quick coupling according to claim 10, wherein the contact line between the rear portion of the second sealing gasket and the male body, comprises several separate linear segments.

12. The quick coupling according to claim 1, wherein a fluid connection between the cavities of the male and female elements is done sealably relative to the outside.

13. The quick coupling according to claim 1, wherein the second peripheral groove is formed on an outer cylindrical wall of the central push-piece, while the first peripheral groove is formed on the outer cylindrical wall of the valve.

14. The quick coupling according to claim 1, wherein the first peripheral groove is formed on the inner cylindrical wall of the male body, while the second peripheral groove is formed on an inner cylindrical wall of the slide valve.

15. The quick coupling according to claim 1, wherein the first peripheral groove, or the second peripheral groove, has an elliptical shape in an oblique plane relative to a plane perpendicular to a longitudinal axis of the coupling element.

16. The quick coupling according to claim 8, wherein the contact between the rear portion of the first sealing gasket and the central push-piece, is a linear contact.

17. The quick coupling according to claim 16, wherein the contact line between the rear portion of the first sealing gasket and the central push-piece, comprises several separate linear segments.

* * * * *